United States Patent [19]

Andres et al.

[11] Patent Number: 4,978,139
[45] Date of Patent: Dec. 18, 1990

[54] ENERGY ABSORBING DEVICE FOR SAFETY BELTS OF MOTOR VEHICLES

[75] Inventors: Rudolf Andres, Sindelfingen; Heinz Knoll; Harald Pfistner, both of Stuttgart; Voker Petri, Aidlingen, all of Fed. Rep. of Germany

[73] Assignee: Mercedes-Benz AG, Fed. Rep. of Germany

[21] Appl. No.: 452,586

[22] Filed: Dec. 19, 1989

[30] Foreign Application Priority Data

Dec. 20, 1988 [DE] Fed. Rep. of Germany ....... 3842791

[51] Int. Cl.$^5$ ............................................. B60R 22/28
[52] U.S. Cl. ..................................... 280/805; 188/372
[58] Field of Search ................. 280/805; 188/371, 372

[56] References Cited

U.S. PATENT DOCUMENTS

| 3,366,353 | 1/1968 | Jackson | 188/371 |
| 3,377,044 | 4/1968 | Jackson et al. | 188/371 |
| 3,392,599 | 7/1968 | White | 188/371 |
| 4,027,905 | 6/1977 | Shimogawa et al. | 280/746 |
| 4,358,136 | 11/1982 | Tsuge et al. | 280/805 |

FOREIGN PATENT DOCUMENTS

| 1296529 | 3/1970 | Fed. Rep. of Germany . |
| 2200565 | 7/1975 | Fed. Rep. of Germany . |
| 2249759 | 11/1982 | Fed. Rep. of Germany . |
| 2413684 | 11/1985 | Fed. Rep. of Germany . |
| 1043670 | 9/1966 | United Kingdom . |

Primary Examiner—Kenneth R. Rice
Attorney, Agent, or Firm—Evenson, Wands, Edwards, Lenahan & McKeown

[57] ABSTRACT

In an energy absorbing damping device for safety belts of motor vehicles, for the purpose of controlled reduction of the deceleration force which acts on the belt user in the event of a collision, a strip element, which is connected to the safety belt, is pulled out of a coil and, by plastically deformed deformation members arranged on both sides of the strip element. The deformation members are formed as two toothed rollers, which engage with one another, so that the strip element, as it is pulled out of the coil, is first deformed sectionally and subsequently pulled straight again.

7 Claims, 1 Drawing Sheet

ENERGY ABSORBING DEVICE FOR SAFETY BELTS OF MOTOR VEHICLES

BACKGROUND AND SUMMARY OF THE INVENTION

The invention generally relates to an energy absorbing damping device for safety belts of motor vehicles, and more particularly to such a device which, despite its small construction, has a high energy absorption capacity with good reproducibility of results.

In the event of an accident, safety belts of motor vehicles are plastically and elastically deformed by the kinetic energy of the secured belt user. The elastic extension of a safety belt is undesirable, as it causes the belt user to be thrown backwards after the extension of the belt in such a manner that injury can result. However, the plastic deformation of a belt also damps the impact during the accident.

This deformation is subject to narrow limits as a result of the nature of the belt strap. For this reason, a provision has already been made for providing the safety belt with an additional damping device. When a given maximum force is reached, this damping device absorbs energy, by plastic deformation or distortion of a strip element, and thus causes a damping of the deceleration effect.

In this connection, U.S. Pat. No. (US-PS) 4,027,905 discloses the provision of guiding a strip element in a serpentine manner around deformation members in the form of bolts or bars which are arranged at a distance one after another. In the event that the strip element is pulled out as a result of an accident, the strip element is alternately deformed, the last deformation member in the pull-out direction once more straightening the strip element.

In the deflection process performed by the bolt or bar-shaped deformation members of the above-noted patent, a high degree of friction arises, which, as experience has shown, results in poor reproducibility of the desired damping. This poor reproducibility is further worsened by the fact that a change takes place in the originally planned frictional force as a result of dust which builds up in the course of time. It is also disadvantageous that, in order to achieve a high energy absorption capacity, several bolts or bars have to be arranged one after another and as a result a large construction length is obtained.

An object of the present invention is to provide an energy absorbing damping device which, in spite of a small construction size, has a high energy absorption capacity with good reproducibility of results.

In the damping device according to preferred embodiments of the present invention, the energy absorption is effected in that a strip element passes between two deformation members in a first operation and undergoes a first sectional deformation with a high degree of deformation, during which it is shortened. In a second operation, which follows immediately, the strip element is once again pulled straight, that is to say lengthened, with further energy absorption. As a result, an optimum shock absorption effect is achieved, which can then be adjusted to differing circumstances if the size of the deformation forces during the pulling-out process of the strip element are controllable, in particular reducible.

In this connection, German Patent Specification No. (DE-PS) 2,249,759 discloses the provision of purposefully changing the retention force of a belt force limiter as a function of certain basic conditions.

In a preferred exemplary embodiment of the invention, a bearing bolt of at least one toothed roller is arranged transversely displaceably to a pull-out direction of the strip element. An adjustment member engaging on the bearing bolt is provided in order to displace it. German Published Unexamined Patent Application No. (DE-OS) 2,200,565 discloses the provision of displacing, traversely to the passing-through direction, a brake block, which acts upon a strap which passes through the brake block and is guided in a serpentine manner so that an automatic return displacement takes place with increasing pull-out force. However, as a result of interconnected springs, it is not possible to provide a deliberately affected control movement for the prevention of the appearance of a force peak at the beginning of the crash.

In a further embodiment of the present invention, the strip element has three sections, of which a central section has a constant width over a length thereof. A section extending towards a pulled end decreases degressively in its width, over its length, from the constant width of the central section to a free end. A section extending towards the other end decreases linearly in its width, over its length, to the constant width of the central section. On account of the fixed size of the differing deformation cross-sections, the retention force of the damping device in a corresponding section of the strip element can be predetermined.

A reference to providing a strip element, which can be pulled out while absorbing energy, with sections of differing widths is made in U.S. Pat. No. (US-PS) 4,027,905, although in this case, on account of the initially large cross-section, an unfavorable force peak must be expected at the beginning of a crash.

Other objects, advantages and novel features of the present invention will become apparent from the following detailed description of the invention when considered in conjunction with the accompanying drawings.

DETAILED DESCRIPTION OF THE DRAWINGS

Figure 1:
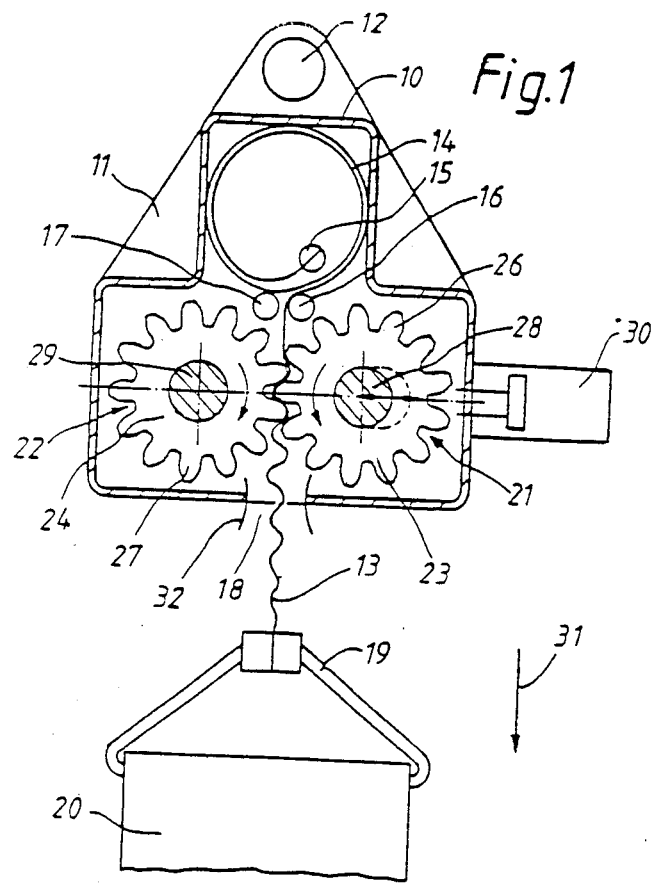
FIG. 1 shows schematically a longitudinal section of a damping device for a safety belt in a vehicle.

The invention is described in greater detail below with reference to an exemplary embodiment which is represented in the drawings.

An energy-absorbing damping device, which is shown schematically in longitudinal section in FIG. 1, for a safety belt of a motor vehicle has a housing 10 which has a fixing bracket 11 with a drill hole 12 for the pivotable fixing to the vehicle body. In the housing 10, a plastically deformable sheet metal strip 13 is accommodated, which at one end is wound up into a coil 14, and is clamped in a pin 15 in the housing 10.

That part of the sheet metal strip 13 which leads away from the coil 14 is guided via a guide bolt 16, directly opposite which in relation to the sheet metal strip a further guide bolt 17 lies, and leaves the housing 10 through a guide sleeve 32 which lies opposite the two guide bolts 16, 17 and is mounted in an opening 18 in the housing. The free end of the sheet metal strip 13 is at this point rigidly connected to a fastening 19 in the form of a triangular link. The crossbar of the link is surrounded by the strap 20 of a safety belt.

In the area between the two guide bolts 16, 17 and the opening 18 in the housing, two deformation members 21, 22 are arranged for the plastic deformation of the sheet metal strip 13 which is guided between them. The two deformation members are formed, for example, as toothed rollers 23, 24 with rounded deformation teeth 26, 27. Each toothed roller 23, 24 is rotatably mounted on a bearing bolt 28, 29 respectively.

The bearing bolt 28 is in this connection arranged axially displaceably transversely to the direction of extension of the sheet metal strip 13 and can be displaced by an adjustment member 30, so that the distance of the two toothed rollers 23, 24 from one another can be adjusted. In all positions of the bearing bolt 28, the deformation teeth of the two toothed rollers 23, 24 engage with one another. The deformation teeth 26, 27 overlap one another extensively in the position of the toothed roller 23 represented in unbroken lines and only slightly in the position of the bearing bolt 28 represented in broken lines.

By means of this engagement of the toothed rollers 23, 24, deformation forces are exerted on the sheet metal strip 13 in the area between the guide bolts 16, 17 and the opening 18 in the housing. These forces act transversely to the direction of extension of the sheet metal strip 13, are opposed to one another and are staggered in relation to one another in the direction of extension of the sheet metal strip 13. By displacing the bearing bolt 28 in the direction of its position shown in broken lines, these deformation forces are reduced.

The method of functioning of the described damping device is explained below.

If the belt strap 20 is stressed with a force which exceeds a predetermined size in the direction of pull indicated by the arrow 31, the sheet metal strip 13 is pulled out of the housing 10 by the fastening 19. The sheet metal strip 13 is unwound from the coil 14 with an absorption of energy, deformed in a meandering manner between the toothed rollers 23, 24 and subsequently aligned in a straight line again. During this process, the sheet metal strip 13 is shortened by the deformation and lengthened again by the pulling straight. This energy reduction thus achieved has a favorable, that is to say in terms of reducing injury or strain, effect on the belt user.

The size of the reduction in energy can be controlled by the adjustment member 30 during the collision, the distance between the two toothed rollers 23, 24 being changed by the transverse displacement of the bearing bolt 28 of the toothed roller 23. This change in the distance allows a change in the retention force very quickly during the collision. In the exemplary embodiment shown, an increase in distance between the two bearing bolts 28, 29 is brought about and thus a time-dependent reduction in the retention force is achieved during the collision.

Figure 2:
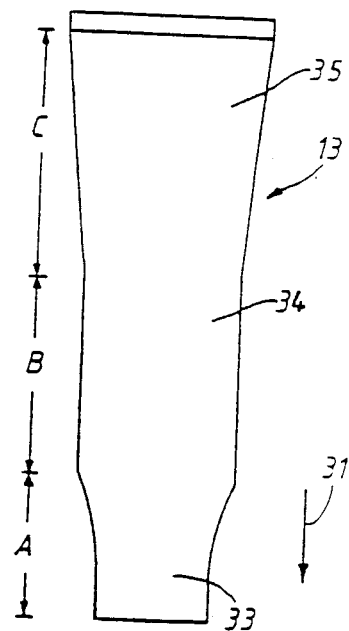
FIG. 2 shows schematically a plan view of an embodiment of the strip element in the damping device shown in FIG. 1.

The sheet metal strip 13 used in the damping device according to FIG. 1 is in general rectangular. It can, however, also, as shown in FIG. 2, be manufactured with different sections of differing sheet cut. In the exemplary embodiment in FIG. 2, the sheet metal strip 13 has three sections 33, 34, 35 the length of each section being indicated by A, B and C, respectively. The central section 34 has a constant width over its entire length B, while the width of the first section 33, with which the fastening 19 engages, decreases degressively, starting from the constant width of the central section 34. The width of the third section 35, which is clamped with its end in the pin 15 of the housing 10, increases linearly over the length C, starting from the constant width of the central section 34. By means of such a cut of the sheet metal of the sheet metal strip 13, which has a constant material thickness, the size of the deformation cross-section can be determined and thus the retention force during the pulling out of the sheet metal strip from the housing 10 can be influenced in a predetermined manner in the event of a collision.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed:

1. An energy absorbing damping device for a safety belt of a motor vehicle comprising;
   a plastically deformable strip element connected to the safety belt;
   a guide bolt for causing a first deflection of the strip element as a result of pulling forces on the safety belt which exceed a certain size; and
   deformation members, which are arranged downstream from the guide bolt in a pull-out direction and on both sides of the strip element, for subsequently alternately deforming the strip element on account of deformation forces provided by the deformation member which act on the strip element in succession and in opposite directions;
   wherein the deformation members are formed as two toothed rollers, which are rotatably mounted on bearing bolts and engage with one another with rounded deformation teeth.

2. A damping device according to claim 1, further comprising force control means for controlling the size of the deformation forces during a pulling-out process of the strip element.

3. A damping device according to claim 1, wherein the bearing bolt of at least one toothed roller is arranged transversely displaceably to the pull-out direction of the strip element and wherein an adjustment member engages on the bearing bolt in order to displace the at least one toothed roller.

4. A damping device according to claim 1, wherein strip element has three sections, including a central section with a constant width over a length thereof, a section extending towards a pulled end which decreases degressively in a width thereof, over a length thereof, from the constant width of the central section to a free end and a section extending towards an other end which has a width that decreases linearly over a length thereof, to the constant width of the central section.

5. A damping device according to claim 1, wherein the strip element is formed as a sheet metal strip.

6. A damping device according to claim 5, wherein the sheet metal strip is made of a corrosion resistant material.

7. A damping device according to claim 5, wherein the corrosion resistant material is stainless steel.

* * * * *